May 11, 1954  C. K. NELSON ET AL  2,677,943
MACHINE FOR MANUFACTURING FROZEN CONFECTIONS
Filed July 13, 1951  5 Sheets-Sheet 1

INVENTOR.
Christian K. Nelson
Clarence K. Dahlberg
BY
H. Lee Helms
ATTORNEY.

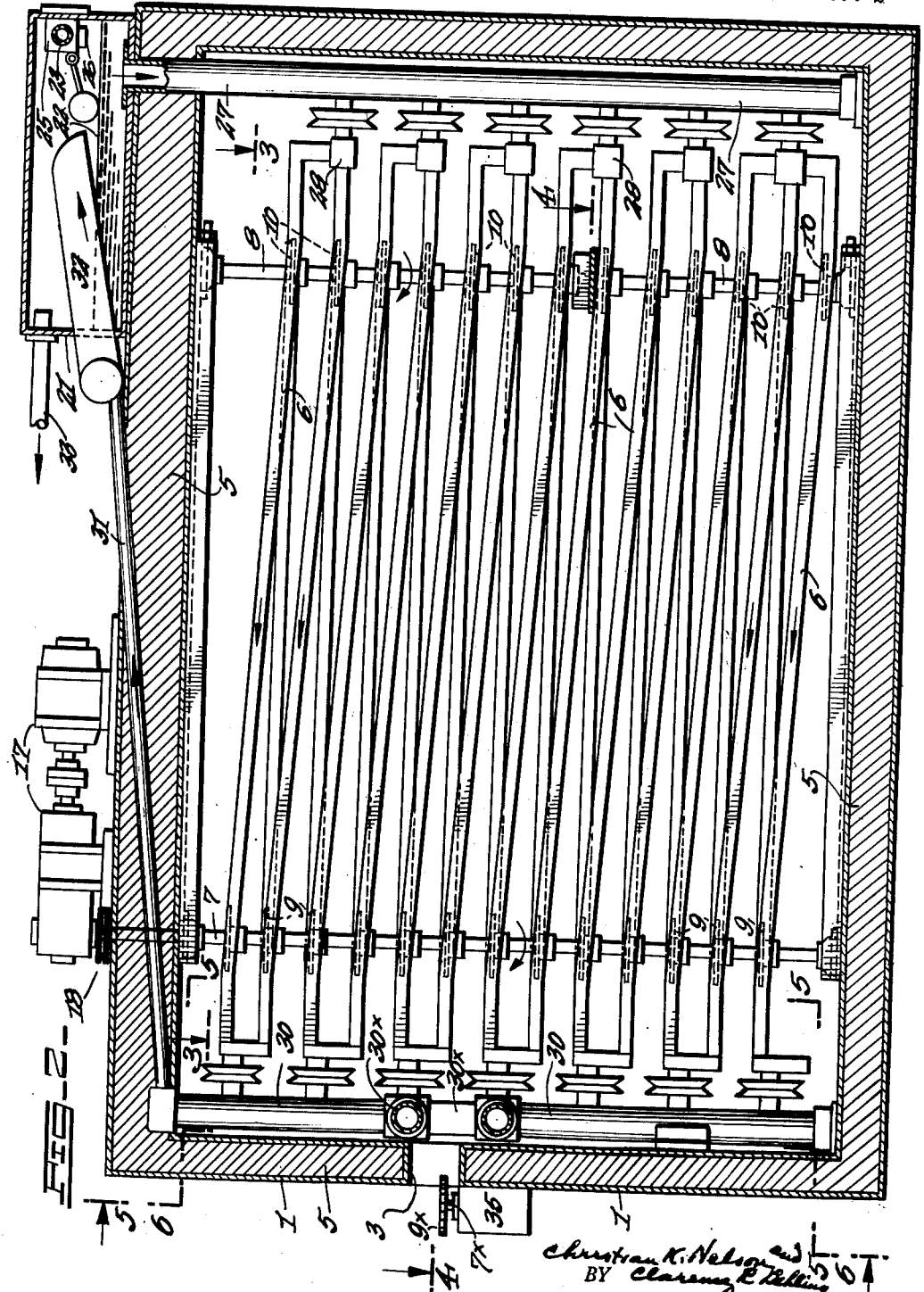

May 11, 1954
C. K. NELSON ET AL
2,677,943
MACHINE FOR MANUFACTURING FROZEN CONFECTIONS
Filed July 13, 1951
5 Sheets-Sheet 3
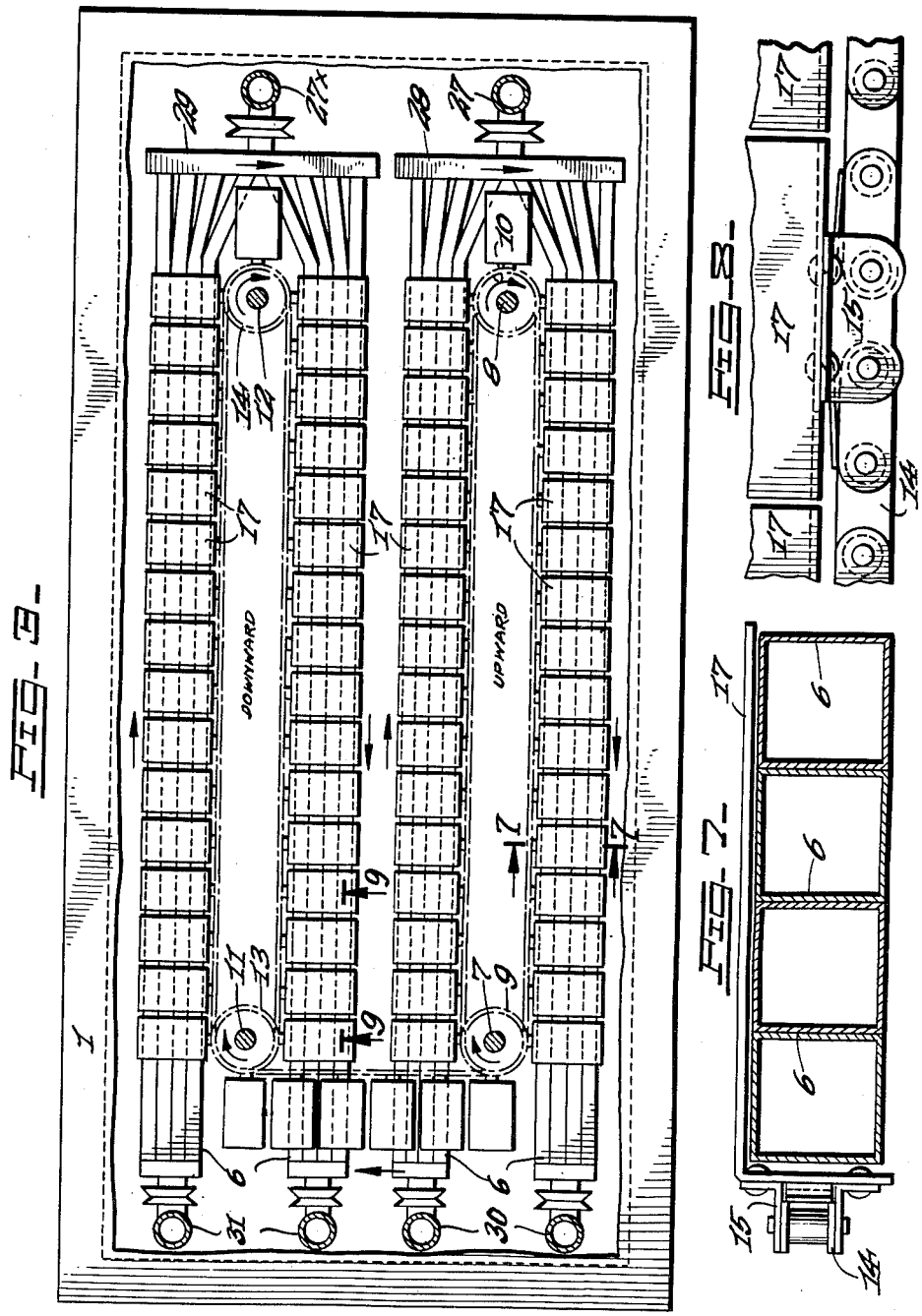
INVENTOR.
Christian K. Nelson
and Clarence R. Behling
BY
W. Lee Helms
ATTORNEY.

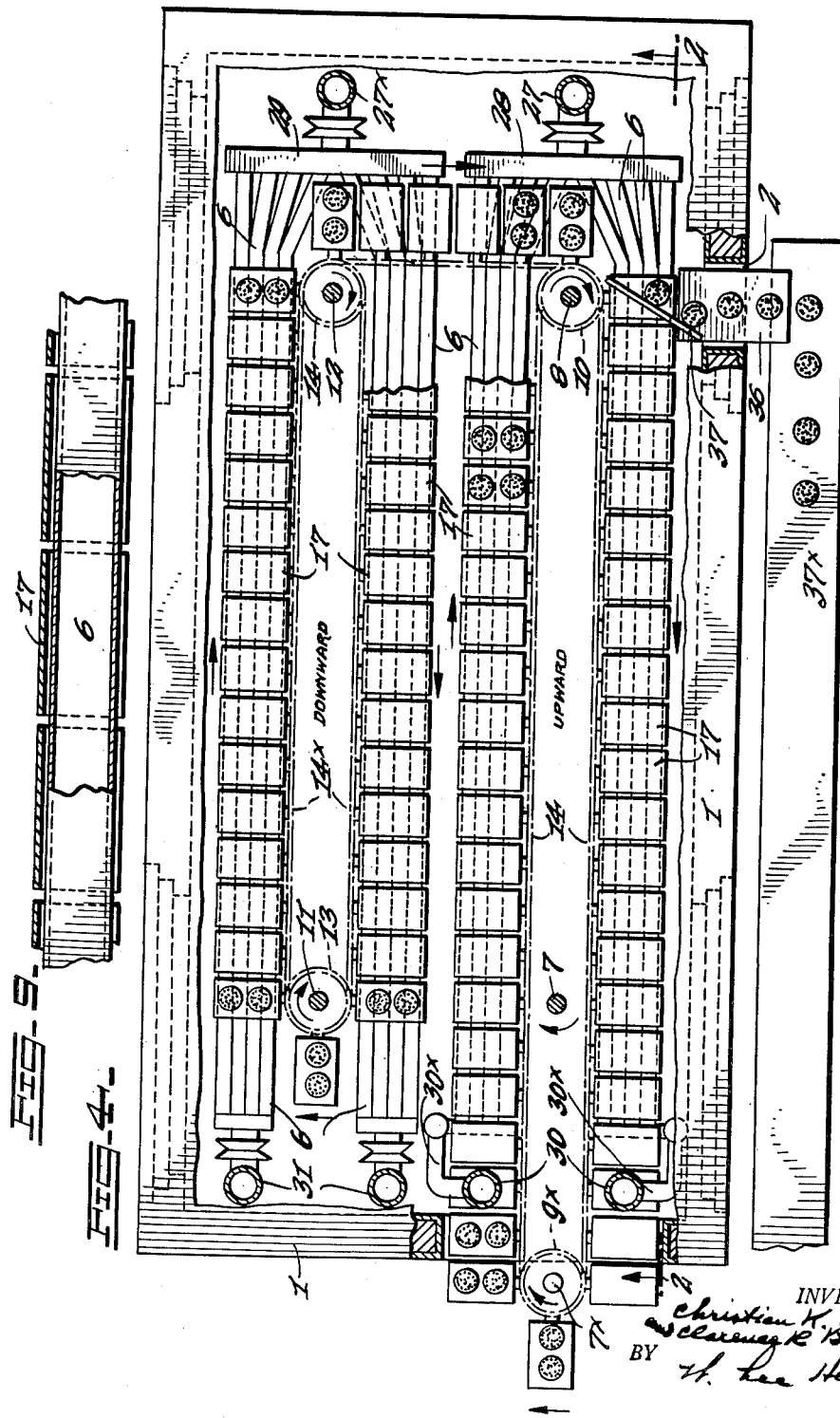

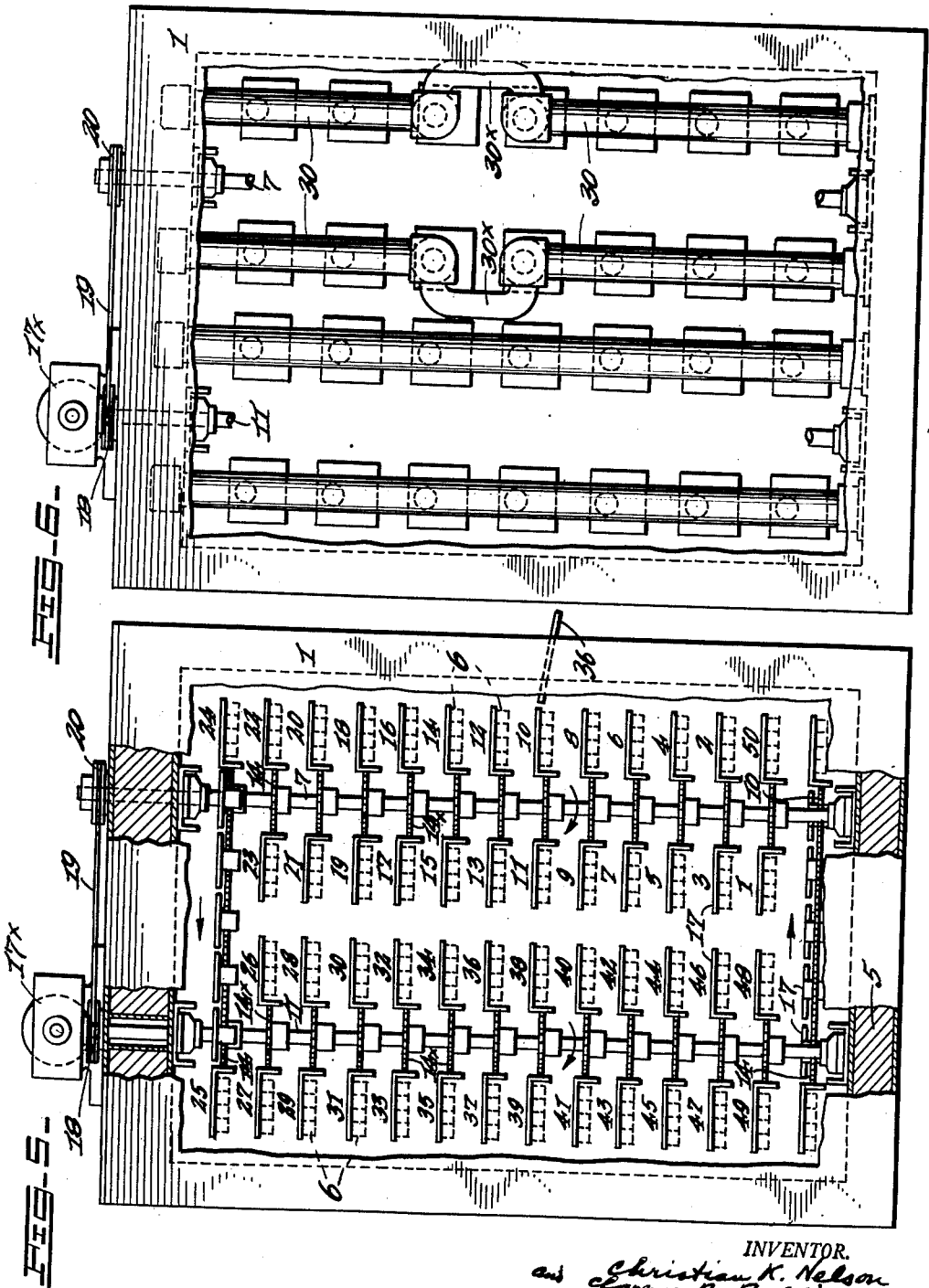

Patented May 11, 1954

2,677,943

UNITED STATES PATENT OFFICE 2,677,943

MACHINE FOR MANUFACTURING FROZEN CONFECTIONS

Christian K. Nelson, San Marino, and Clarence R. Behling, Pasadena, Calif., assignors to Eskimo Pie Corporation, Bloomfield, N. J., a corporation of Delaware Application July 13, 1951, Serial No. 236,653

5 Claims. (Cl. 62—114)

The object of the present invention is to provide a compact and efficient refrigeration unit for frozen confections such, for example, as ice cream bars, bonbons, and other special forms. A characteristic of the invention is the employment of two or more stacked units each comprising a plurality of hollow refrigerant containing lengths, the lengths of each stack being inclined by means of which carriers for the mix to be solidified may be moved back and forth in elongated inclined paths from a station at which the mix, preferably in initial plastic form, is deposited on the successive carriers as they move into register with the depositing station. At the end of their travel, the carriers come into registration with a discharge station at which the solidified confections are removed and may be carried by belt feed to an enrober, as for example, a station at which the confections are coated with molten chocolate. These and other characteristics of the invention will be described with reference to the accompanying drawings, in which Figure 1 is a view in perspective showing a casing partly broken away and showing various elements of the apparatus;

Figure 2 is a vertical section extending longitudinally through the structure of Figure 1 on the line 2—2 of Figure 1 and on the line 2—2 of Figure 4;

Figure 3 is a horizontal section, taken on the line 3—3 of Figure 2;

Figure 4 is a horizontal section taken on the line 4—4 of Figure 2;

Figure 5 is a view taken on the line 5—5 of Figure 2, the view thus being broken away;

Figure 6 is a view in elevation, partly broken away, on line 6—6 of Figure 2;

Figure 7 is an enlarged fragmentary vertical section on the line 7—7 of Figure 3;

Figure 8 is a plan view, partly broken away showing the structure of Figure 7, and Figure 9 is an enlarged longitudinal and vertical section on the line 9—9 of Figure 3.

Figure 1:
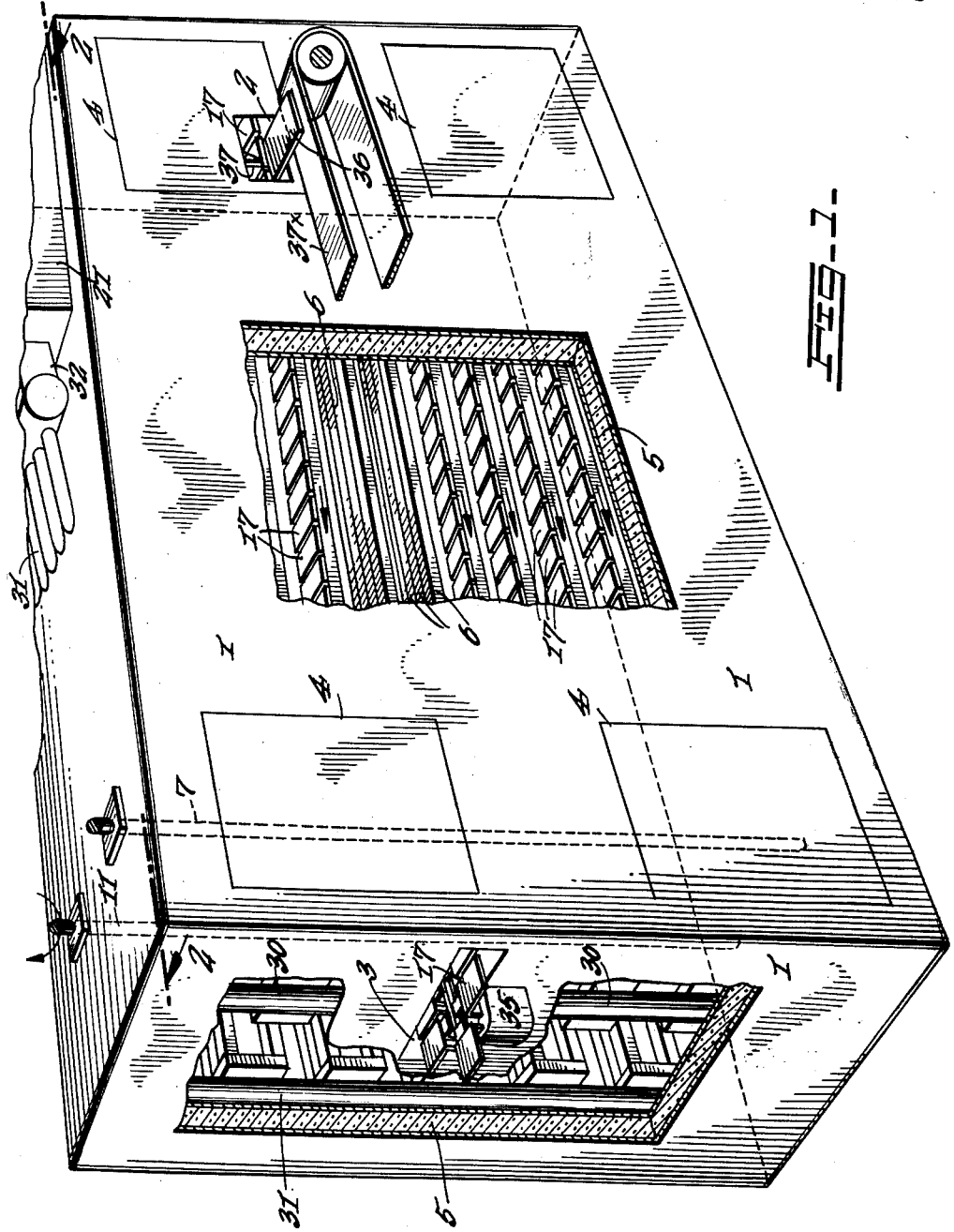

Referring to the drawings, it will be seen that the embodiment therein shown comprises a casing 1 having a discharge opening 2 for the solidified confections and a loading opening 3 at which point the carriers are exposed to successively receive the material to be frozen. Suitable doors 4 are provided for access to the interior of the casing and the latter is double-walled to enclose insulation generally indicated at 5.

Referring more particularly to Figures 2 and 4, it will be seen that the casing in the present embodiment encloses two refrigeration units. Each unit embodies a plurality of longitudinally extending lengths of hollow refrigerant containing supports for carrier plates. In the present embodiment, each length consists of four tubes flat on the top and preferably rectangular in cross section, these tubes being indicated at 6. Each length of refrigerant tubes is stacked in an appropriate one of two parallel stacks comprising a refrigerant unit. As stated, two of said units are shown.

In the present embodiment the carrier plates are progressively moved over the tubes of one refrigerant unit and then are carried to and progressively over the tubes of the second refrigerant unit, thence back to the first unit, so that there is a continuous passage of each carrier plate over all of the refrigerant tubes.

Each length of refrigerant tubes 6 is inclined as shown more particularly in Fig. 2. The two stacked rows of tubes 6 comprising the first unit lie at opposite sides of shafts 7 and 8, Figs. 2 and 4. On shaft 7 are a plurality of sprocket wheels 9 and on shaft 8 are a plurality of sprocket wheels 10.

The two sets of inclined and stacked refrigerant tubes for the second unit lie at opposite sides of shafts 11 and 12. Shaft 11 carries a plurality of sprocket wheels 13 and shaft 12 carries a plurality of sprocket wheels 14.

Engaging and driven by the sprocket wheels 9 and 10 is a chain belt 14x which is best shown in Figs. 7 and 8. Carried by the chain at spaced areas thereof are brackets 15, each bracket holding a carrier plate 17. These carrier plates are directly supported upon the refrigerant tubes as shown in Figs. 3 and 4. The chain 14 is endless. For convenience, reference is now made to Figs. 2 and 5. Reference to Fig. 2 will show by the arrows the direction of the chain belt and carrier plate movement. As to the refrigerant unit, it will be visualized by reference to Fig. 2 that the belt leads from the lowermost right-hand sprocket 10 to the more elevated lowermost left-hand sprocket 9 and thence in orderly progressive inclination back and forth around shafts 7 and 8 until the chain reaches the top whereat its transfer to the second refrigeration unit shown at the left-hand of Fig. 5, the chain being progressively led downward until it reaches a return point carrying it back to the first refrigeration unit. Inasmuch as the second or left-hand refrigeration unit is, as to form and arrangement of the stack of refrigerant tubes, the same as that shown in Fig. 2 but arranged for downward rather than upward movement of the chain and carrier plates, the illustration in Fig. 2 will suffice for both of the two refrigeration units.

From Fig. 5 it will be noted that the chain is led at the bottom to the carrier position 50, then around the shaft to the position 1, thence to position 2 and around the shaft to position 3, progressing in such manner to position 24, at which point the chain is led to sprocket 14, Fig. 4, and to position 25, Fig. 5, whereupon the chain passes to position 26, then to position 27, and so on until it reaches position 49. At this point it is led back to position 50 of the first refrigeration unit the chain being endless. The carrying plates therefor will have a spiral upward path over the stacked and progressively upwardly inclined refrigerant tubes of the first unit, and will then be carried to the second unit for progressive downward movement to the station of return of the carrier plates to the first refrigeration unit.

A motor drive, indicated at 17, is provided for shaft 11, the latter carrying a pulley 18 connected by belt 19 with a pulley 20 on shaft 7.

The refrigerating units are, in the present embodiment, of the flood type. To that end there is provided at the top of the casing a reservoir 21 in which a constant level of refrigerant is maintained, the level being indicated at 22, the refrigerant flowing from a source of supply through pipe 23, the latter leading to a float control valve 25 which discharges through outlet 26. The refrigerant flows downward through two vertical tubular headers 27 and 27x which discharge into a plurality of manifolds 28 and 29 for the refrigerant tubes which discharge into a plurality of manifolds 28 and 29, the manifolds 28 being in communication with the refrigerant tubes of the first unit which embraces shafts 7 and 8 and the manifolds 29 being connected to the refrigerant tubes of the second unit embracing shafts 11 and 12. At the end of the casing opposite the tubular headers 27 are a plurality of refrigerant receiving headers 30 for the refrigerant tubes of refrigerating unit 1 and corresponding tubular headers 31 for the refrigerant tubes of the second unit. Each of the receiving tubular headers 30, 31 is connected at its top to a discharge or relief pipe 31x, one of which is shown in Fig. 2. These pipes lead to a discharge trough 32 having its discharge end above the refrigerant level 22 in the reservoir 21. A suction pipe 33 communicates with casing 21 and carries off saturated refrigerated gases.

In order that at one area of the casing, the plates in their travel may project outwardly for receiving partially frozen units to be solidified, a supplemental shaft 7x carrying a sprocket 9x is provided, the sprocket receiving chain 14. This is best shown in Figs. 2 and 4 wherein shaft 7x is carried by a boxlike housing 35 secured to the front of the casing, the sprocket 9x being in registration with a casing aperture 3.

As shown in Figs. 1 and 4 the completely refrigerated confections in their travel pass into registration with a discharge opening, where they may be discharged on to a receiving plate 36 and thence carried to a belt 37x which may lead to an enrober for any suitable coating as, for example, chocolate, or to a packaging station. Any suitable means may be provided for moving the solidified confections from the successive carrier plates reaching the discharge opening in the casing 1. In the drawings, I have indicated a deflector plate at 37. It will be noted from Fig. 6 that at the receiving stage for opening 3 in the casing the carrier plates are moved to and beyond the vertical headers 30, and that these headers are split or made sectional so that the carrier plates may move forwardly beyond them, around shaft 7x, and thence into return position. To that end the tubular headers are in upper and lower sections, the units of each section being connected by an offset conduit 30x.

It will be understood that where one refrigeration unit, normally the right-hand unit shown in the drawings, will sufficiently freeze and harden the confection units, the second unit may serve as a carrier receiving and return device, and that any suitable carrier receiving and return means may be substituted.

In the operation of the apparatus the carrier plates will, in their travel, reach a suitable position for the deposit thereon of a partially frozen ice cream or similar mix. This mix may be led from a continuous freezer to a suitable forming throat for shaping the mix into bars or other shapes, the mix being successfully cut off into portions at the end of the forming throat and deposited upon the carrier plates in succession as they are moved outwardly of the casing, for example, as shown in Fig. 4. As the carrier plates move upwardly, and back and forth in the first refrigeration unit, thus deposited frozen mix sections will progressively solidify, this continuing as the confections are passed downward by the second refrigeration unit. The freezing continues during the re-transfer of the carrier plates to the first unit. The refrigeration continues until the completely frozen sections come into register with the deflector 37 and plate 36 at which point they are discharged on to belt 37x. Thus it will seen that the depositing station for the first and right-hand refrigerating unit is at a higher stage than the discharge station.

It will be understood that various modifications may be made in the form and arrangement of the elements constituting the embodiment of the invention illustrated in the drawings described above, without departing from the spirit of the invention, what I claim and desire to secure by Letters Patent, being as follows:

1. A machine for making frozen confections comprising an insulated cabinet having a chamber therein, said cabinet having an inlet aperture and an outlet aperture, a first refrigerant unit having refrigerant inlet means for introducing refrigerant into said chamber and refrigerant outlet means for removing refrigerant from said chamber, a plurality of ascending refrigerant pipes communicating between said inlet and outlet means, a second refrigerant unit disposed adjacent said first refrigerant unit and having a plurality of descending refrigerant pipes communicating between said inlet and outlet means, a first vertical axle disposed near said refrigerant inlet means and having a plurality of sprockets adapted to engage a chain conveyor, a second vertical axle having a plurality of sprockets and spaced apart from said first vertical axle and adapted to engage an endless chain conveyor, an endless chain conveyor provided with carrier plates disposed slidably on said ascending and descending refrigerant pipes, said endless chain conveyor being adapted to ascend the first refrigerant unit and to descend the second refrigerant unit, whereby confections to be frozen are conveyed on and by said carrier plates disposed on said ascending and descending refrigerant pipes in said chamber until a suitable degree of freezing has been effected, and means for driving said axles to actuate said chain conveyor.

2. A machine for making frozen confections comprising a cabinet having an interior chamber refrigerant inlet means extending into the interior chamber for introducing refrigerant solution into said chamber, refrigerant outlet means extending out of said chamber and in spaced relation to said refrigerant inlet means for removing said refrigerant from the interior of said chamber, a plurality of declined conduits and a plurality of inclined conduits, both in communication with said inlet and outlet means for conveying refrigerant therebetween, a continuous chain conveyor having horizontally disposed carrier plates adapted to hold confection to be frozen, said carrier plates being secured to said chain conveyor and disposed slidably upon the conduits, a first vertical axle disposed near said inlet means and having a plurality of sprockets thereon about which said conveyor is turned, a second vertically disposed axle having a plurality of sprockets thereon disposed near the said refrigerant outlet means and adapted to rotate said endless chain conveyor, means for rotating said sprockets to drive the endless conveyor, and means for circulating refrigerant through said inlet and outlet means and through said tubes.

3. The apparatus of claim 2 in which a short vertical axle disposed outside of said cabinet and having a sprocket engaged by the chain, whereby said conveyor plates of said chain conveyor may be loaded with confections outside of the cabinet.

4. A machine for making frozen confections as set forth in claim 2, and having means guiding and projecting a length of the chain conveyor, with its carrier plates, in a horizontal loop exteriorly of the cabinet, during the travel thereof, and withdrawing the carrier plates from said pipes to receiving position for frozen confections and then returning said carrier plates into contact with said pipes.

5. In a machine for making frozen confections, as set forth in claim 2, said conveyor having means for transferring the carrier plates from a conduit of the inclined conduits to a conduit of the declined conduits and means for transferring the carrier plates successively from a conduit of the declined conduits back to a tube of the inclined conduits.

References Cited in the file of this patent
UNITED STATES PATENTS

| Number | Name | Date |
|---|---|---|
| 1,053,033 | Haupt | Feb. 11, 1913 |
| 1,891,425 | Kronquest | Dec. 20, 1932 |
| 2,136,969 | Downey | Nov. 15, 1938 |
| 2,196,080 | Reynoldson | Apr. 2, 1940 |
| 2,237,256 | Finnegan | Apr. 1, 1941 |
| 2,478,465 | Dodson | Aug. 9, 1949 |
| 2,498,248 | Chamberlain | Feb. 21, 1950 |
| 2,511,661 | Allard | June 13, 1950 |
| 2,563,938 | Kirk | Aug. 14, 1951 |